(12) United States Patent
Hosomi

(10) Patent No.: US 11,052,622 B2
(45) Date of Patent: Jul. 6, 2021

(54) TIRE MANUFACTURING METHOD

(71) Applicant: Toyo Tire Corporation, Itami (JP)

(72) Inventor: Kazumasa Hosomi, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 16/589,446

(22) Filed: Oct. 1, 2019

(65) Prior Publication Data

US 2020/0108672 A1 Apr. 9, 2020

(30) Foreign Application Priority Data

Oct. 3, 2018 (JP) .............. JP2018-188131

(51) Int. Cl.
*B29D 30/00* (2006.01)
*B60C 19/00* (2006.01)

(52) U.S. Cl.
CPC .. *B29D 30/0061* (2013.01); *B29D 2030/0077* (2013.01); *B29D 2030/0083* (2013.01); *B60C 19/00* (2013.01); *B60C 2019/004* (2013.01)

(58) Field of Classification Search
CPC ........ B29D 30/0061; B29D 2030/0077; B29D 2030/0083; B60C 19/00; B60C 2019/004; B60C 11/243; H01Q 1/2241
USPC ...................................... 156/110.1
See application file for complete search history.

(56) References Cited

U.S. PATENT DOCUMENTS

| | | | |
|---|---|---|---|
| 2006/0022893 A1* | 2/2006 | Kish ............ | H01Q 7/00 |
| | | | 343/897 |
| 2008/0192451 A1 | 8/2008 | Sinnett et al. | |
| 2010/0123584 A1 | 5/2010 | Lionetti et al. | |
| 2010/0212791 A1* | 8/2010 | Incavo ............ | B60C 23/0493 |
| | | | 152/152.1 |
| 2011/0284155 A1 | 11/2011 | Sevaille et al. | |
| 2012/0091209 A1* | 4/2012 | Hotaling ............ | B32B 38/00 |
| | | | 235/488 |
| 2017/0225524 A1 | 8/2017 | Tamura | |
| 2019/0300680 A1* | 10/2019 | Cho ............ | C08K 3/04 |
| 2019/0322142 A1 | 10/2019 | Lallement et al. | |
| 2019/0341673 A1* | 11/2019 | Destraves ............ | H01Q 1/38 |

FOREIGN PATENT DOCUMENTS

| | | |
|---|---|---|
| CN | 106355238 A | 1/2017 |
| CN | 107683214 A | 2/2018 |
| EP | 1 547 824 A2 | 6/2005 |
| EP | 1 942 445 A1 | 7/2008 |
| FR | 3 059 603 A1 | 6/2018 |

(Continued)

OTHER PUBLICATIONS

Search Report dated Feb. 4, 2020 in corresponding European Application No. 19200570.0; 5 pages.

(Continued)

*Primary Examiner* — Robert C Dye
*Assistant Examiner* — Sedef E Paquette
(74) *Attorney, Agent, or Firm* — Maier & Maier, PLLC

(57) ABSTRACT

A tire manufacturing method includes: a step of arranging rubber inside a spring antenna of an electronic component having a communication function, a step of interposing by rubber sheets the electronic component having the spring antenna into which rubber was arranged, and a setting step of arranging the electronic component interposed by rubber sheets in a tire.

7 Claims, 7 Drawing Sheets

(56) References Cited

FOREIGN PATENT DOCUMENTS

| | | | | |
|---|---|---|---|---|
| GB | 439192 A | * | 12/1935 | ............. B60C 11/20 |
| JP | 2005-178747 A | | 7/2005 | |
| JP | 2007-230261 A | | 9/2007 | |
| JP | 2008-167448 A | | 7/2008 | |
| JP | 2008-536357 A | | 9/2008 | |
| JP | 2009-140434 A | | 6/2009 | |
| JP | 2011-525654 A | | 9/2011 | |
| JP | 2016-037235 A | | 3/2016 | |
| KR | 10-2009-0036750 A | | 4/2009 | |
| WO | WO-9929523 A1 | * | 6/1999 | ......... B60C 23/0493 |
| WO | 2006/098710 A1 | | 9/2006 | |
| WO | 2007/100111 A1 | | 9/2007 | |
| WO | 2011/002440 A1 | | 1/2011 | |

OTHER PUBLICATIONS

Reasons for Rejection dated Jun. 4, 2019 in corresponding Japanese application No. 2018-188131; 9 pages.
Decision to Grant dated Aug. 13, 2019 in corresponding Japanese application No. 2018-188131; 5 pages.
Chinese Office Action dated May 7, 2021, in connection with corresponding CN Application No. 201910915303.9 (15pp., including machine-generated English translation).

* cited by examiner

TIRE MANUFACTURING METHOD

CROSS-REFERENCE TO RELATED APPLICATIONS

This application is based on and claims the benefit of priority from Japanese Patent Application No. 2018-188131, filed on 3 Oct. 2018, the content of which is incorporated herein by reference.

FIELD

The present invention relates to a manufacturing method of a tire into which an electronic component is embedded.

BACKGROUND

Conventionally, a tire embedding an electronic component such as an RFID tag has been known. With such a tire, it is possible to carry out production management of the tire, usage history management, etc. by the RFID tag embedded in the tire and a reader as external equipment carrying out communication. For example, Japanese Unexamined Patent Application, Publication No. 2009-140434 discloses an IC tag with a rubber cover applicable to management of various manufactured goods.

SUMMARY

According to the technology shown in Japanese Unexamined Patent Application, Publication No. 2009-140434, it is possible to integrate an IC tag and rubber cover by interposing the IC tag with an unvulcanized rubber sheet. However, as an antenna of an electronic component such as an RFID tag used in a tire, in order to reduce the stress generated during tire deformation, it is preferable to use a coil-like spring antenna which can follow the deformation of the tire. However, with the technology shown in Japanese Unexamined Patent Application, Publication No. 2009-140434, interposing an electronic component having a coil-like spring antenna is not given consideration. Therefore, the unity between the rubber sheet and spring antenna is insufficient, and there is concern over a spring antenna not following the movement of rubber when the tire deforms, and the electronic component having the spring antenna being damaged.

The present invention has been made taking account of the above-mentioned problem, and an object thereof is to provide a tire manufacturing method which can prevent damage to an electronic component, even in a case of providing an electronic component having a spring antenna to the tire.

A manufacturing method of a tire according to a first aspect of the present invention includes the steps of: arranging rubber inside a spring antenna of an electronic component having a communication function; interposing by rubber sheets the electronic component having the spring antenna into which the rubber was arranged; and setting the electronic component interposed by the rubber sheets in a tire.

According to a second aspect of the present invention, in the manufacturing method of a tire as described in the first aspect, the tire may further include: a carcass ply, and side-wall rubber which is provided to an outer side in a tire-width direction of the carcass ply, and the rubber sheets may be configured from rubber having a higher modulus than the side-wall rubber.

In a manufacturing method of an electronic component according to a third aspect of the present invention, the electronic component includes a spring antenna that transmits and receives wireless signals, and an RFID chip to which the spring antenna is connected, and to be set in a tire in a state interposed by rubber sheets, and the method includes a step of arranging rubber inside the spring antenna.

According to the present invention, it is possible to provide a tire manufacturing method which can prevent damage to an electronic component, even in a case of providing an electronic component having a spring antenna to the tire.

DETAILED DESCRIPTION

First Embodiment

Figure 1:
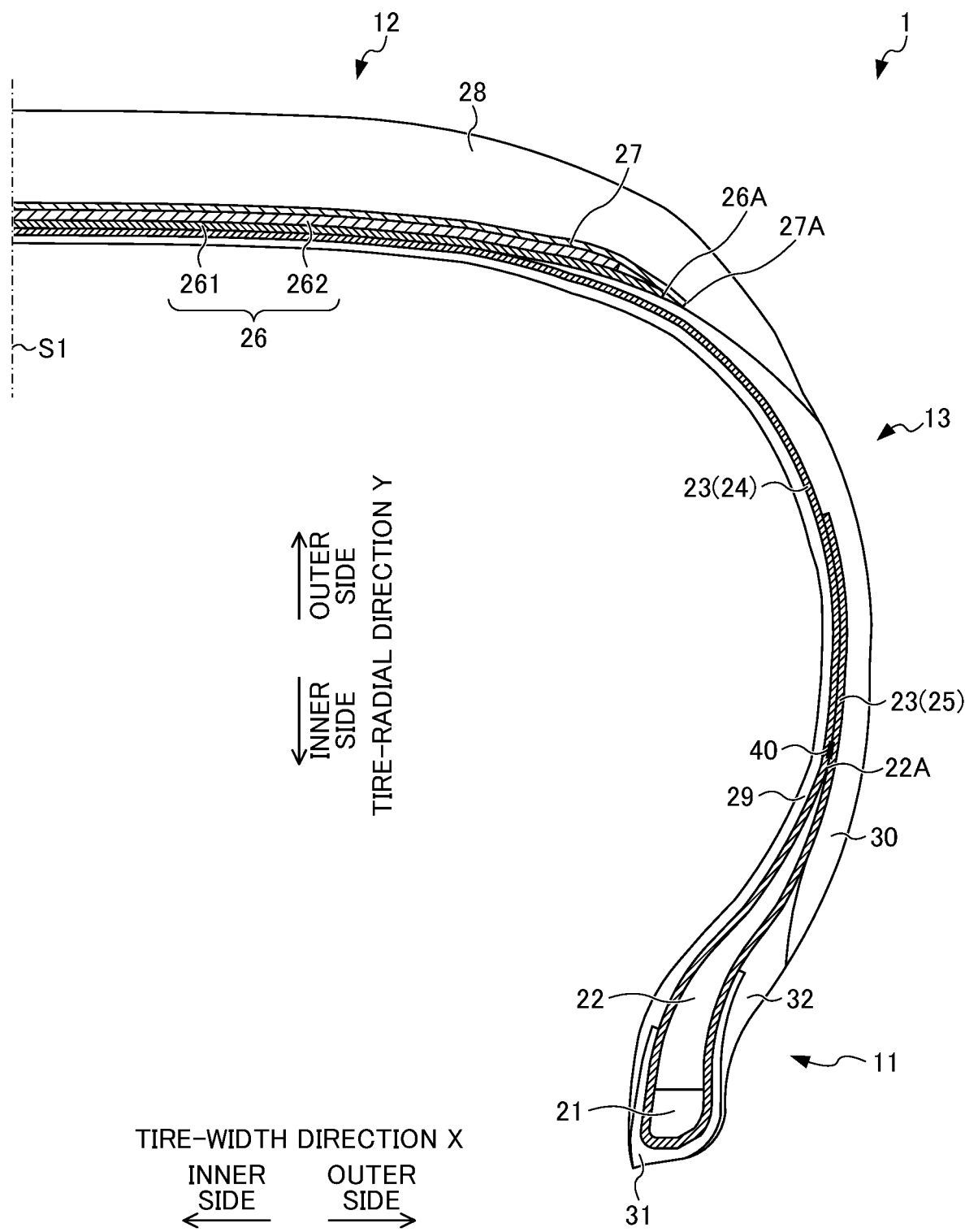
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer side of tire-radial direction is a direction distancing from the tire rotation axis, and is the upper side of the paper plane in FIG. 1. Inner side of tire-radial direction is a direction approaching the tire rotation axis, and is the lower side of the paper plane in FIG. 1. The same also applies to FIGS. 2, 10 and 11.

The tire 1 is a tire for passenger cars, for example, and includes a pair of beads 11 provided at both sides in the tire-width direction, a tread 12 forming the contact patch with the road surface, and a pair of side walls 13 extending between the pair of beads 11 and the tread 12.

The bead 11 includes an annular bead core 21 formed by wrapping around several times bead wires made of metal coated with rubber, and a bead filler of tapered tip shape extending to the outer side in the tire-radial direction of the bead core 21. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability, and is configured from rubber of a higher modulus than the surrounding rubber members, for example.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. In the present embodiment, the ply folding part 25 is overlapped with the ply body 24. The carcass ply 23 is configured by a plurality of ply cords extending in the tire-width direction. In addition, a plurality of ply cords is arranged side by side in a tire circumferential direction. This ply cord is configured by an insulated organic fiber cord such as polyester or polyamide, or the like, and is covered by rubber.

In the tread 12, at least one ring-shaped steel belt 26 which extends in a circumferential direction of the tire is provided in the outer side in the tire-radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although two layers of steel belts 261, 262 are provided, the number of layered steel belts 26 is not limited thereto.

At the outer side in the tire-radial direction of the steel belt 26, a cap ply 27 serving as a belt reinforcement layer is provided. The cap ply 27 is configured from an insulating organic fiber layer such as of polyamide fibers, and is covered by rubber. By providing the cap ply 27, it is possible to achieve an improvement in durability and a reduction in road noise while travelling.

The tread rubber 28 is provided at the outer side in the tire-radial direction of the cap ply 27. A tread pattern (not illustrated) is provided to the outer surface of the tread rubber 28, and this outer surface serves as a contact patch which contacts with the road surface.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

A chafer 31 is provided on the inner side in the tire-radial direction of the carcass ply 23 provided around the bead core 21 of the bead 11. The chafer also extends to the outer side in the tire-width direction of the ply folding part 25 of the carcass ply 23, and rim strip rubber 32 is provided at the outer side in the tire-width direction thereof and the inner side in the tire-radial direction. The outer side in the tire-width direction of this rim strip rubber 32 connects with the side wall rubber 30.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna 421 having high communicability and flexibility can be used. The spring antenna 421 is set to an optimized antenna length, according to the frequency band, etc. to be used. In a storage part inside the RFID chip 41, identification information such as a manufacturing number and part number is stored. The RFID tag 40 of the present embodiment is embedded in the tire 1 in a state covered by the protective member 43 described later.

As shown in FIG. 1, the RFID tag 40 is embedded in a region between the tire-radial direction outside end 22A of the bead filler 22 and the tire-width direction outside end 26A of the steel belt 26. In other words, the RFID tag 40 is arranged at a position sufficiently distanced from metal bead core 21, which has a possibility of adversely affecting communication. Herein, the bead core 21 is formed in a ring shape by winding in layers of metal bead wires, and thus is a metal member having a particularly high possibility of adversely affecting communication.

In addition, the RFID tag 40 is arranged to be separated so as not to contact with the steel belt 26. Consequently, no communication disturbance will occur by the antenna length substantially changing due to contact between the antenna of the RFID tag 40 and the steel belt 26. It should be noted that the antenna length of the RFID tag 40 is optimized according to the frequency band, etc. of the radio waves to be used, and if the antenna length changes by contact with a metal member, communication disturbance will occur.

Herein, adding to the present embodiment, the cap ply 27 extends more to the outside in the tire-width direction than the steel belt 26. Then, the RFID tag 40 is provided in a region between the tire-radial direction outside end 22A of the bead filler 22, and the tire-width direction outside end 27A of the cap ply 27. According to this configuration, the RFID tag 40 is reliably prevented from contacting with the steel belt 26.

Further adding to the present embodiment, the RFID tag 40 is embedded in a region between the tire-radial direction outside end 22A of the bead filler 22 and a tire-widest part vicinity A of the side wall 13. In other words, the RFID tag 40 is arranged at a position far from the metal bead core 21, and also far from the steel belt 26, and thus the possibility of the RFID tag 40 being adversely affected by metal components is low. Herein, tire-widest part refers to the widest position in the tire-width direction cross section, when assembling the tire to a normal rim, filling with normal internal pressure and establishing an unloaded state not applying load. Then, tire-widest part vicinity A indicates within a range of 20% the cross-sectional height centered around the widest position, i.e. within a range of a position of 10% the cross-sectional height to the tire-radial direction outer side and position of 10% the cross-sectional height to the tire-radial direction inner side, centered around the widest position. Herein, cross-sectional height is a numerical value decided by the tire size, for example, in the case of a tire of size 195/65 R15, "cross-sectional height=called width×ellipticity=195×0.65=126.75 mm".

Figure 2:
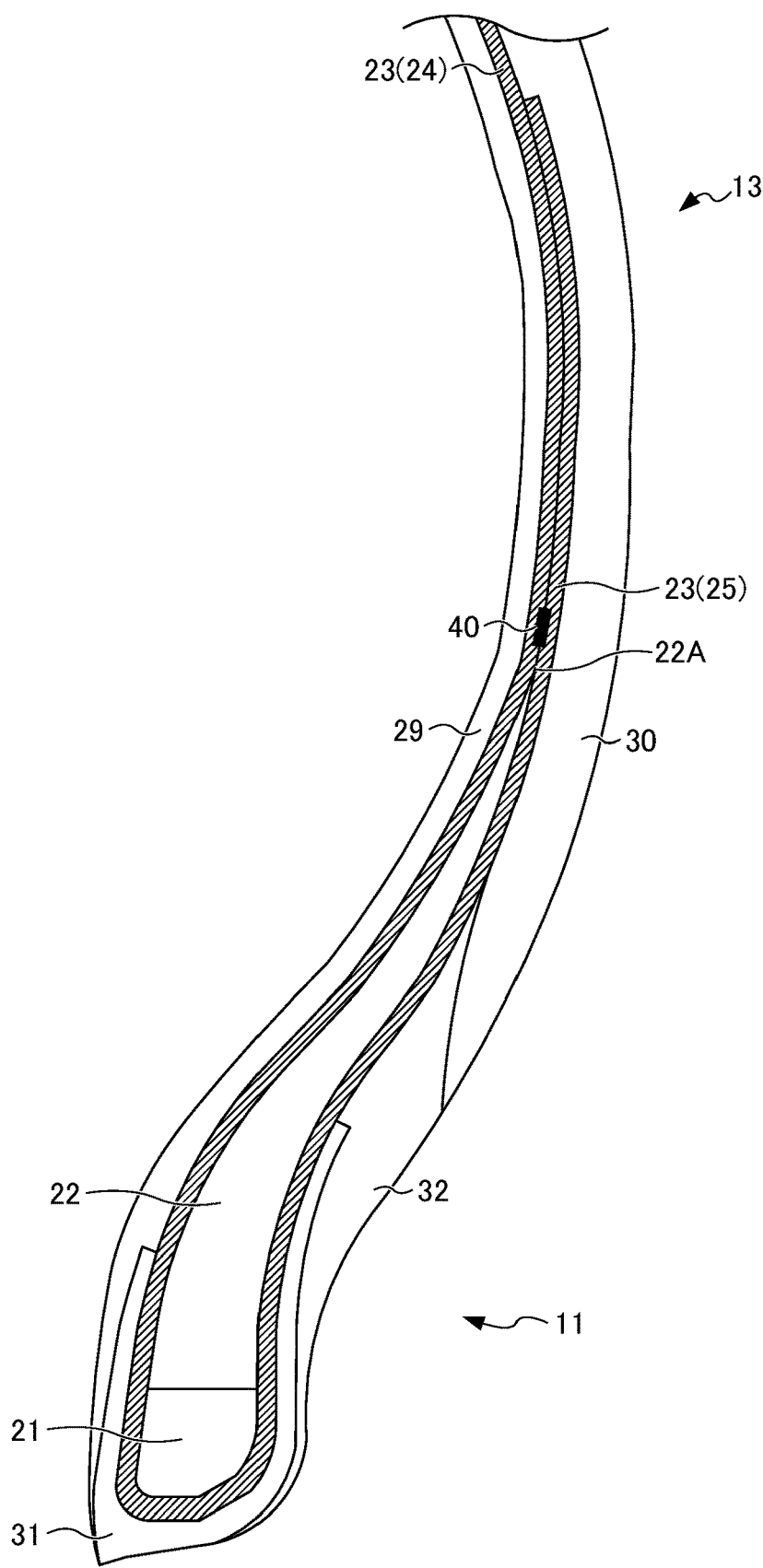
FIG. 2 is a partially enlarged view of a tire according to the first embodiment of the present invention.

FIG. 2 is an enlarged cross-sectional view showing around the embedded part of the RFID tag 40. As shown in FIG. 2, in the present embodiment, the RFID tag 40 is arranged in a state sandwiched between the ply body 24 and ply folding part 25.

In addition, since the RFID tag 40 is sandwiched between the ply body 24 and ply folding part 25, it is possible to prevent the antenna of the RFID tag 40 from directly pushing the side wall rubber 30 and/or inner liner 29 which are the rubber structure of the tire 1, during vulcanization or during use.

Next, the configuration of the RFID tag 40 and the protective member 43 configured from a rubber sheet covering the RFID tag 40 according to the present embodiment will be explained.

The RFID tag 40 of the present embodiment includes the coil-shaped spring antenna 421 having high communicability and flexibility as the antenna. The spring antenna 421 is set to an optimized antenna length, according to the frequency band, etc. to be used. In the present embodiment, rubber is arranged inside the spring antenna 421 prior to interposing the RFID tag 40 by the two rubber sheets 431, 432 constituting the protective member 43. More preferably, rubber is filled into the spring antenna so that air will not remain as much as possible. This process and the reason for adopting this process will be explained using FIGS. 3 to 9.

Figure 3:
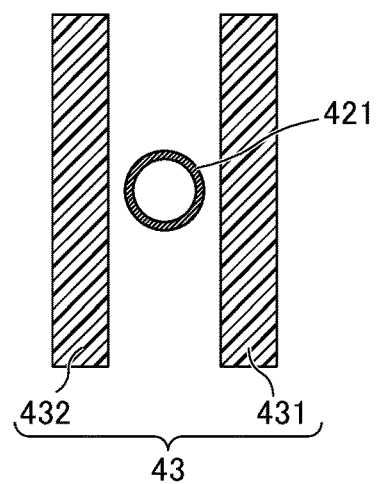
FIG. 3 is a view showing a cross section prior to interposing the RFID tag by rubber sheets, in a case of not filling rubber inside a spring antenna.
Figure 4:
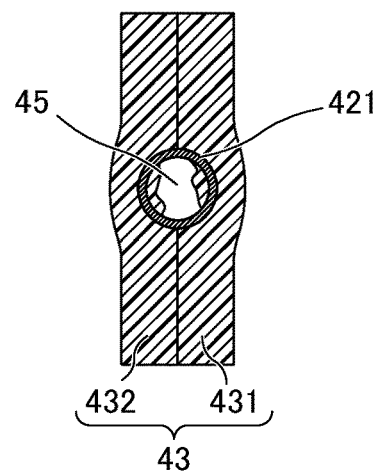
FIG. 4 is a view showing a cross section after interposing the RFID tag by rubber sheets in a case of not filling rubber inside a spring antenna.

First, a state of the surroundings of the RFID tag 40 in a case of not filling rubber into the spring antenna 421 will be explained as a comparative example using FIGS. 3 to 5. FIG. 3 is a view showing a cross section of the spring antenna 421, and rubber sheets 431, 432, prior to interposing the RFID tag 40 by the rubber sheets 431, 432. FIG. 4 is a view showing a cross section of the spring antenna 421, and rubber sheets 431, 432, after interposing the RFID tag 40 by the rubber sheets 431, 432.

As shown in FIG. 4, in this comparative example, since rubber is not filled into the spring antenna 421 in advance, a certain amount of air 45 may remain within the spring antenna 421 after interposing by the rubber sheets 431, 432. If air remains in this way, the integrity of the rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the rubber sheets 431, 432 herein. Consequently, by pushing the rubber sheets 431, 432 from both sides, the rubber sheets 431, 432 sticks to some extent inside the spring antenna 421 as shown in FIG. 4. However, very large amounts of time and labor are required in order to stick the rubber sheets 431, 432 until the inside of the spring antenna 421 is completely embedded.

Figure 5:
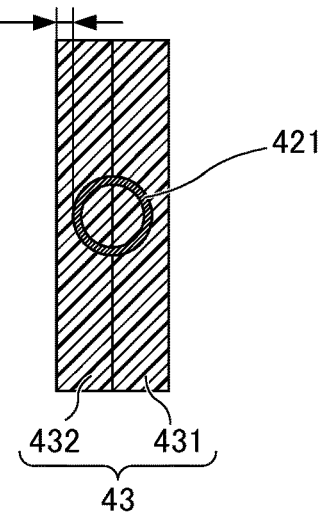
FIG. 5 is a view showing a cross section after interposing the RFID tag by rubber sheets, in a case of not filling rubber inside a spring antenna.

Then, even if assuming a case of taking time and sticking the rubber sheets until the inside of the spring antenna is embedded, the distance L between the outer circumferential part of the spring antenna 421 and the outer surface of the rubber sheets 431, 432 becomes very short, as shown in FIG. 5. In addition, it is difficult to stabilize this distance L, and locally thin portions can occur. Consequently, the protection of the RFID tag 40 by the rubber sheets 431, 42 becomes insufficient, and during vulcanization, there is a possibility of the rubber sheets 431, 432 being damaged, and the spring antenna 421 and carcass ply 23 contacting.

Therefore, in the present embodiment, prior to interposing the RFID tag 40 by the rubber sheets 431, 432, the rubber is arranged within the spring antenna 421, as shown in FIGS. 6 to 9. More preferably, rubber is filled within the spring antenna so that air does not remain as much as possible. It should be noted that the views shown on the right sides of FIGS. 6 to 9 are views showing a transverse section of the spring antenna 421 and the surrounding thereof.

Figure 6:
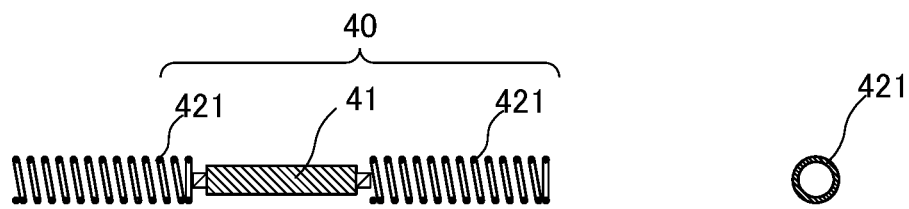
FIG. 6 is a view showing a cross section of the RFID tag prior to filling rubber inside a spring antenna, in a tire according to the first embodiment of the present invention.
Figure 7:
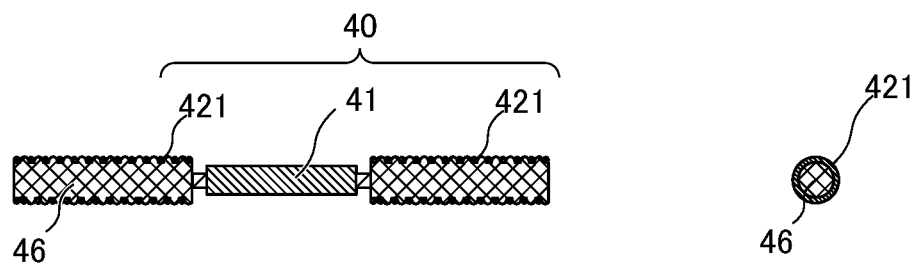
FIG. 7 is a view showing a cross section of the RFID tag after filling rubber inside a spring antenna, in a tire according to the first embodiment of the present invention.

FIG. 6 is a transverse section showing a state prior to filling the rubber 46 into the spring antenna 421, and FIG. 7 is a transverse section showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the rubber sheets 431, 432 as the rubber 46, in consideration of the workability, etc. It should be noted that preferably unvulcanized rubber is used as the rubber 46 arranged within the spring antenna 421. By establishing the rubber 46 and rubber sheets 431, 432 as unvulcanized rubber and vulcanizing simultaneously, the integrity of the rubber 46, rubber sheets 431, 432 and spring antenna 421 rises. In addition, the rubber 46, and rubber sheets 431, 432 are more preferably established as the same type of rubber. It should be noted that, by emphasizing the flexibility of the spring antenna 421, rubber of lower modulus than the rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 8:
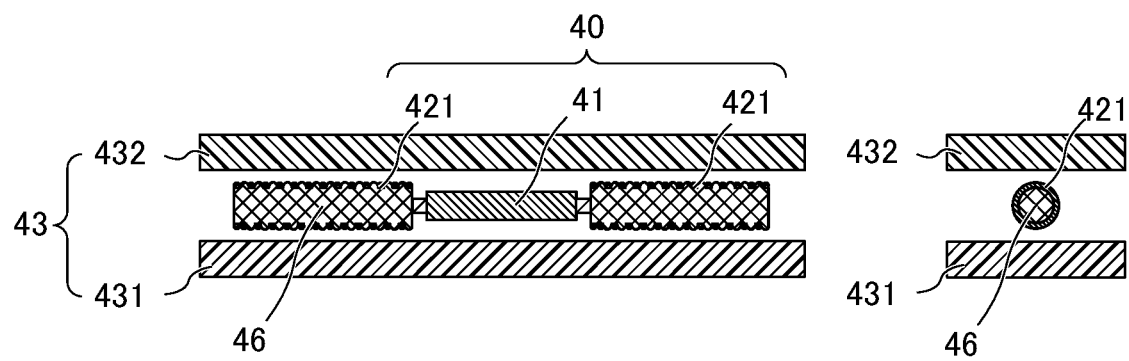
FIG. 8 is a view showing a cross section of the RFID tag prior to interposing by rubber sheets, in a tire according to the first embodiment of the present invention.
Figure 9:
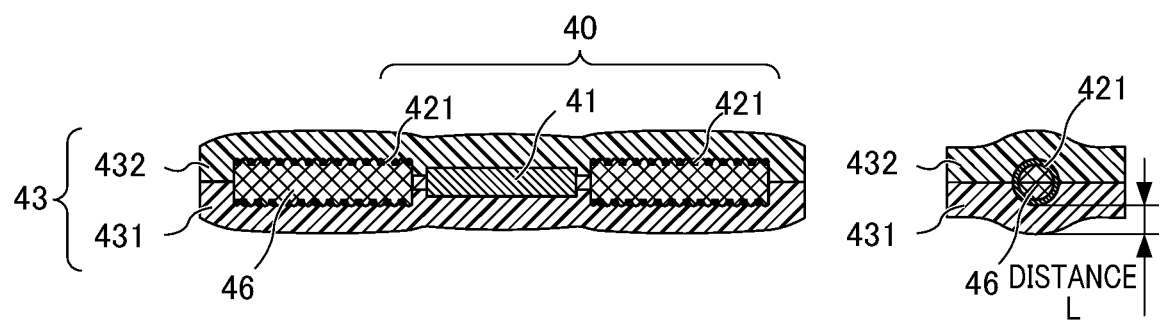
FIG. 9 is a view showing a cross section of the RFID tag interposed by a rubber sheet, in a tire according to the first embodiment of the present invention.

FIG. 8 is a transverse section showing a state prior to interposing the RFID tag 40 into which the rubber 46 is filled in the spring antenna 421, by the rubber sheets 431, 432, and FIG. 9 is a transverse section showing a state after interposing by the rubber sheets 431, 432.

As shown in FIG. 9, according to the present embodiment, since the rubber 46 is filled in advance into the spring antenna 421, no air pockets exist between the rubber sheets 431, 432. Consequently, since it is unnecessary to be concerned over air pockets, the process of interposing the RFID tag 40 by the rubber sheets 431, 432 also becomes easy. In addition, by the rubber 46 being arranged within the spring antenna 421, the integrity of the spring antenna 421, rubber 46, and rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the rubber sheets 431, 432 stabilizes. In other words, a distance close to the thickness of the rubber sheets 431, 432 is generally secured as this distance L. Consequently, the RFID tag 40 is sufficiently protected by the rubber sheets 431, 432.

Herein, the two rubber sheets 431, 432 serving as the protective member 43 which covers the RFID tag are configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used.

For example, with the modulus of the side wall rubber 30 as a reference, it is preferable to use rubber of a modulus 1.1 to 2 times as the rubber used in the protective member 43.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as raw rubber, and thus can appropriately protect the RFID tag 40. In addition, as the protective member 43, an organic fiber layer from polyester fibers or polyamide fibers may be provided. It is also possible to embed an organic fiber layer in the two rubber sheets 431, 432.

In this way, if configuring the protective member 43 by two rubber sheets, since it is possible to thinly form the RFID tag 40 including the protective member 43, it is favorable upon embedding in the tire 1. In addition, when assembling the RFID tag 40 in the constitutional members of the tire 1 prior to vulcanization, the RFID tag 40 covered by the rubber sheets can be installed very easily. For example, at a desired position of the carcass ply 23 prior to vulcanization, it is possible to appropriately paste the RFID tag 40 covered by the rubber sheets using the adhesiveness of the raw rubber. In addition, by also establishing the rubber sheets as raw rubber prior to vulcanization, it is possible to more easily paste by employing the adhesiveness of the rubber sheet itself as well.

In the present embodiment, the RFID tag 40 comes to be sandwiched between the ply body 24 and the ply folding part 25 in a state covered by the protective member 43. In this case, by the existence of the protective member 43, the RFID tag 40 is protected even under the situation of the RFID tag 40 receiving stress from the ply body 24 and ply folding part 25 moving relatively. Consequently, the durability of the RFID tag 40 further improves. It should be noted that the tire-widest part vicinity A is a portion which relatively greatly bends during tire deformation. As shown in the present embodiment, by protecting the RFID tag 40 by way of the protective member 43, it is possible to raise the durability of the RFID tag 40, even in a case of embedding the RFID tag 40 in such a portion.

In addition, by providing the protective member 43, it becomes possible to prevent the spring antenna 421 of the RFID tag 40 from directly pushing the surrounding rubber structure, during vulcanization or during usage. It should be noted that, from the viewpoint of enhanced protection, the RFID tag covered by the rubber sheet in the vulcanized state may be attached to the carcass ply 23 prior to vulcanization.

It should be noted that the RFID tag 40 covered by the protective member 43 is embedded in the tire so that the longitudinal direction thereof becomes the direction of the tangential line relative to the circumferential direction of the tire, i.e. direction orthogonal to the paper plane in the cross-sectional view of FIGS. 1 and 2. In addition, the rubber sheets 431, 432 are embedded in the tire in a form such that aligns in the tire-width direction. In other words, in the manufacturing process, one surface of either one of the rubber sheets 431, 432 is pasted to a constituent member of the tire prior to vulcanization, e.g., the carcass ply 23. By establishing such a form, stress will hardly act on the RFID tag 40, even when the tire deforms. In addition, in the manufacturing process, the work of attaching the RFID tag 40 covered by the protective member 43 becomes easy.

Herein, the protective member 43 covering the RFID tag 40 is attached prior to the vulcanization process in the manufacturing process of the tire. In the present embodiment, the protective member 43 covering the RFID tag 40 is attached to the ply body 24 or ply folding part 25 of the carcass ply 23 prior to the coating rubber being vulcanized. At this time, since the coating rubber of the carcass ply 23 is in a state of raw rubber prior to vulcanization, it is possible to paste the protective member 43 to the carcass ply 23 employing the adhesiveness thereof. Alternatively, it may be pasted using an adhesive or the like. After pasting, by overlapping the ply body 24 and ply folding part 25, the protective member 43 covering the RFID tag 40 is interposed by the carcass ply 23. Subsequently, the green tire in which the respective constituent members including the RFID tag 40 are assembled is vulcanized in a vulcanization step to manufacture the tire. In this way, in the present embodiment, since it is possible to paste the protective member covering the RFID tag 40 to the carcass ply 23 covered by the raw rubber having rigidity and having adhesiveness during tire manufacture, the assembly work of the RFID tag 40 in the manufacturing process of the tire is easy. In addition, in the vulcanization process of the green tire, so long as adopting a form vulcanizing the protective member 43 in the raw rubber state and the rubber 46 in the raw rubber state together, it is possible to achieve streamlining of the manufacturing process.

It should be noted that the present embodiment is particularly effective in the case of the RFID tag 40 being arranged more to the tire inner cavity side than the carcass ply 23, e.g., more to the inner side in the tire-width direction, as that shown in FIGS. 1 and 2. During temperature rise in the vulcanization process of the green tire, the expansion amount of rubber members such as the inner liner 29 surpasses the expansion amount of the carcass ply 23. Consequently, in a case of the distance L becoming shorter, as shown in FIG. 5, the RFID tag 40 is pressed to the carcass ply 23 arranged to the inner side in the tire-width direction thereto, whereby the possibility of the rubber sheet 431 or 432 on the outer side in the tire-width direction of the RFID tag 40 being damaged rises. Therefore, if adopting the present embodiment in a case of the RFID tag 40 being arranged more to the inner side in the tire-width direction than the carcass ply 23, it is possible to more effectively protect the RFID tag 40, even under such conditions.

It should be noted that, in the present embodiment, the RFID tag 40 is arranged in a state sandwiched between the ply body 24 and ply folding part 25; however, in the case of the ply being configured by a plurality of plies, for example, in the case of configuring by an upper ply (inside carcass ply) and down ply (outside carcass ply), the RFID tag 40 may be arranged in a state sandwiched between the plurality of plies, e.g., the upper ply and down ply.

It should be noted that, in the present embodiment, the RFID tag 40 is embedded in the tire as the electronic component; however, the electronic component embedded in the tire is not limited to an RFID tag. For example, it is applicable to various electronic components such as sensors including a spring coil and performing wireless communication. For example, the electronic component may be a piezoelectric element or strain sensor.

According to the tire 1 of the present embodiment, the following effects are exerted.

(1) In the present embodiment, provided are a step of arranging the rubber 46 inside the spring antenna 421 of the RFID tag 40 serving as an electronic component having a communication function; a step of interposing by the rubber sheets 431, 432 the RFID tag 40 having the spring antenna 421 in which the rubber 46 is arranged; and a setting step of fixedly setting the RFID tag 40 interposed by the rubber sheets 431, 432 in the tire 1. In addition, in the present embodiment, provided is a step of arranging rubber inside the spring antenna 421, as a manufacturing method of an electronic component fixedly set in the tire in a state interposed by rubber sheets. Air 45 will thereby not remain inside the spring antenna 421. In addition, since it is unnecessary to be concerned over air pockets, the work for interposing the RFID tag 40 by the rubber sheets 431, 432 also becomes easy. In addition, since the distance L between the outer circumferential part of the spring antenna 421 and the outer surface of the rubber sheets 431, 432 is stabilized, the RFID tag 40 is sufficiently protected by the rubber sheets 431, 432.

(2) In the present embodiment, the RFID tag 40 interposed by the rubber sheets 431, 432 is mounted to the tire 1 so that the RFID tag 40 is positioned on the tire inner cavity side of the carcass ply 23 when the tire is completed. It is thereby possible to protect the RFID tag 40 more effectively, even when considering the thermal expansion of each member during vulcanization.

(3) In addition, in the present embodiment, the RFID tag 40 interposed by the rubber sheets 431, 432 is mounted to the carcass ply 23, so as to establish a state in which the RFID tag 40 is sandwiched between the overlapped carcass ply 23 when the tire is completed.

(4) In the present embodiment, the rubber sheets 431, 432 are configured from rubber of higher modulus than the side-wall rubber 30. Consequently, it is possible to more reliably protect the RFID tag 40.

(5) In the present embodiment, the step of arranging rubber 46 inside of the spring antenna 421 is a step of filling, in an electronic component 40 which includes a spring antenna 421 that transmits or receives wireless signals, rubber 46 only inside the spring antenna 421 of the electronic component 40.

(6) In the present embodiment, in the manufacturing method of an electronic component which is interposed by rubber sheets 431, 432, the step of arranging rubber 46 inside of the spring antenna 421 is a step of filling, in an electronic component 40 which includes a spring antenna 421 that transmits or receives wireless signals, rubber 46 only inside the spring antenna 421 of the electronic component 40, wherein the method further comprises a step of interposing the spring antenna 421 in which the rubber 46 was filled and the RFID chip 41 by rubber sheets 431, 432.

Second Embodiment

Next, a tire 2 according to a second embodiment will be explained while referencing FIGS. 10 and 11. It should be noted that the same reference symbol will be attached for the same configurations as the first embodiment in the following explanation, and detailed explanations thereof will be omitted.

Figure 10:
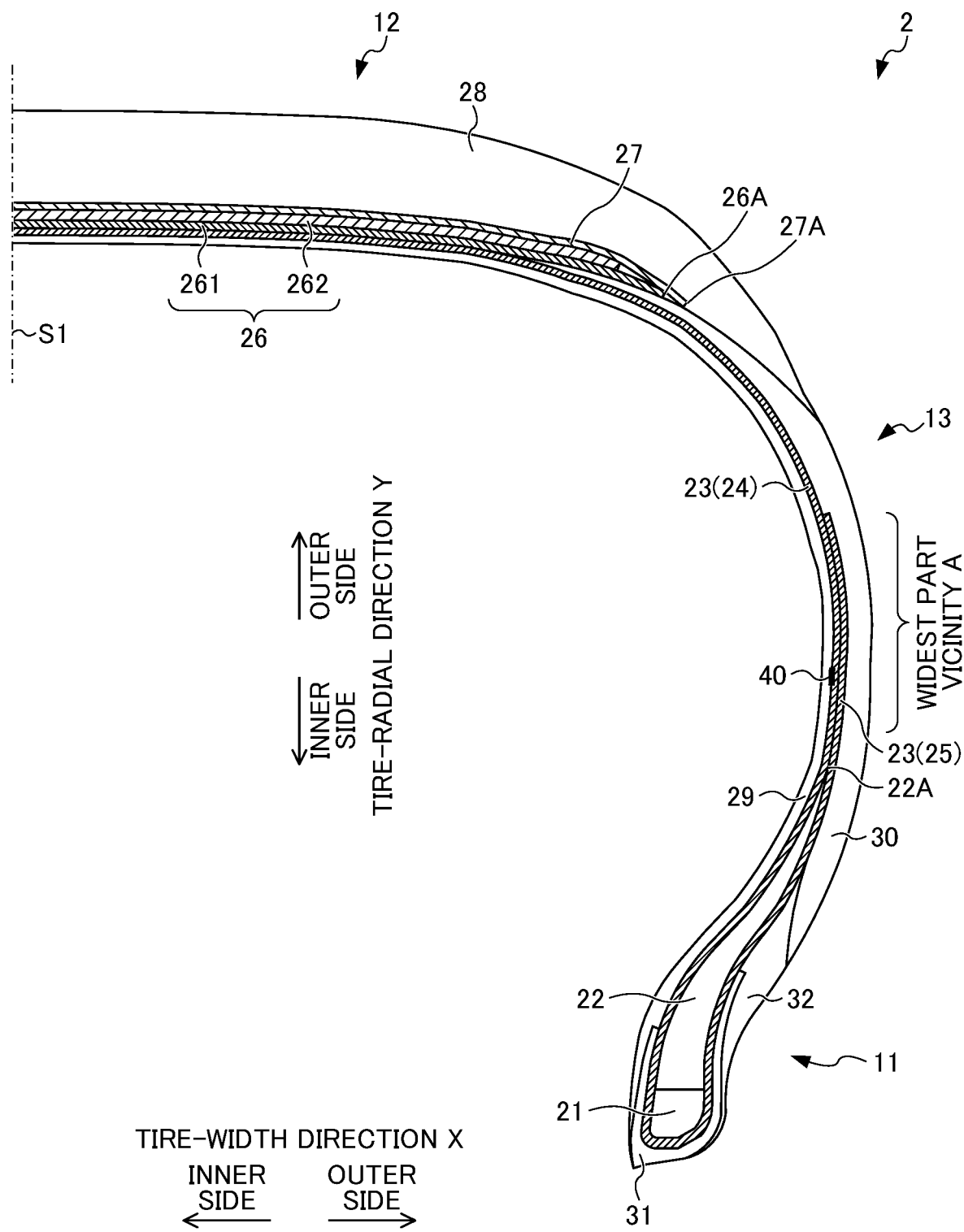
FIG. 10 is a view showing a half section in a tire-width direction of a tire according to a second embodiment of the present invention.

FIG. 10 is a view showing a half section of the tire-width direction of the tire 2 in the present embodiment. FIG. 11 is an enlarged cross-sectional view showing a vicinity of the embedded part of the RFID tag 40 in the tire 2 of FIG. 10. In the present embodiment, the RFID tag 40 serving as the electronic component is arranged between the carcass ply 23 and inner liner 29. More specifically, it is arranged between the ply body 24 of the carcass ply 23 and the inner liner 29. Then, similarly to the first embodiment, the RFID tag 40 is embedded in a region between the tire-radial direction outside end 22A of the bead filler 22 and the tire-width direction outside end 26A of the steel belt 26. More specifically, the RFID tag 40 is embedded in a tire widest part vicinity A of the side wall 13.

Figure 11:
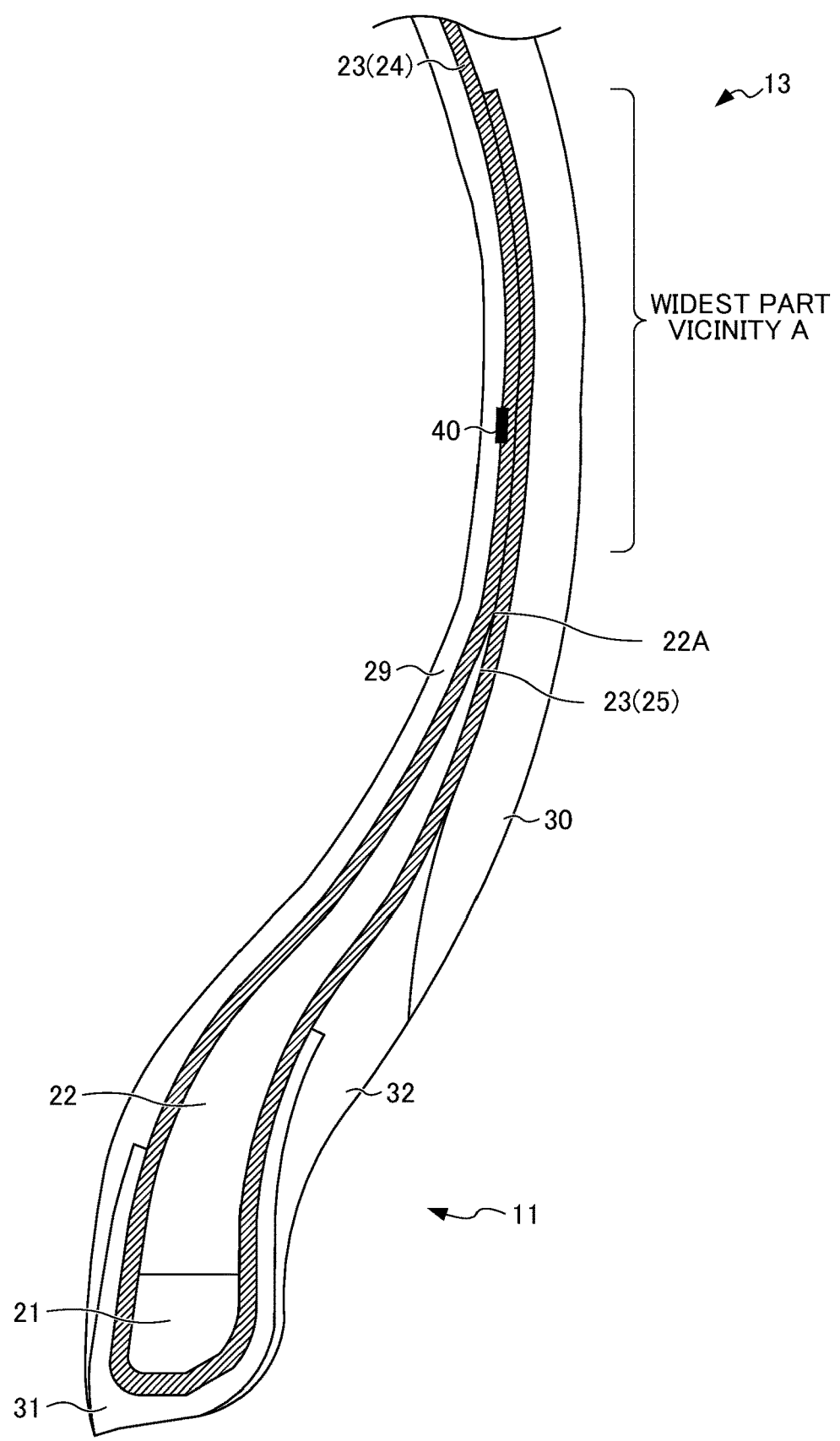
FIG. 11 is a partially enlarged cross-sectional view of the tire according to the second embodiment of the present invention.

Also in the present embodiment, as shown in FIGS. 10 and 11, there is a particularly high effect of filling rubber in advance into the spring antenna 421, since the RFID tag 40 is arranged more to the tire inner cavity side than the carcass ply 23, more specifically, more to the inner side in the tire-width direction. In other words, during temperature rise in the vulcanization process of the green tire, since the expansion amount of rubber members such as the inner line 29 surpasses the expansion amount of the carcass ply 23, by the RFID tag 40 being pushed to the carcass ply 23 arranged to the outer side in the tire-width direction thereof, there is a possibility of the rubber sheet 431 or 432 on the outer side in the tire-width direction of the RFID tag 40 being damaged. However, so long as adopting the configuration of the present embodiment, it is possible to prevent such situations.

In addition, according to the present embodiment, the shock protection also improves. In other words, even if a shock acts on the tire, since the distance from the outer wall surface of the tire 2 until the RFID tag 40 is far, and since the carcass ply 23 exists between the outer wall surface of the tire 2 and the RFID tag 40, the RFID tag 40 will be protected. It should be noted that, in the manufacturing process of the tire, the protective member 43 covering the RFID tag 40 is mounted to the ply body 24 of the carcass ply 23 or the inner liner 29 prior to the coating rubber being vulcanized.

It should be noted that, in the present embodiment, the RFID tag 40 is arranged in a region between the inner liner 29 and carcass ply 23, when viewing in the tire-width direction. Therefore, the modulus of the protective member 43 may be set to a value higher than the modulus of the inner liner 29 and lower than the modulus of the coating rubber of the carcass ply 23. In the case of the modulus within the tire coming to change stepwise, and the tire deforming, it is thereby possible to prevent excessive stress from generating within the rubber structure at the embedded part of the RFID tag 40. In other words, it is possible to suppress the generation of stress.

According to the tire 2 of the present embodiment, the following effects are exerted in addition to the above (1), (2) and (4) to (6).

(7) In the present embodiment, the RFID tag 40 interposed by the rubber sheets 431, 432 is attached to the carcass ply 23 or inner liner 29, so as to establish a state in which the RFID tag 40 is sandwiched between the carcass ply 23 and inner liner 29, when the tire is completed. Consequently, since the distance from the outer wall surface of the tire until the RFID tag 40 is far, the RFID tag 40 is more suitably protected even when shock acts on the tire.

Third Embodiment

Figure 12A:
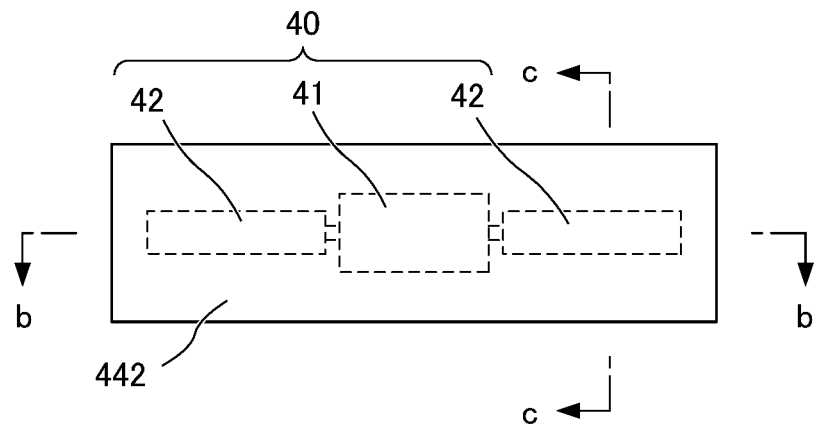
FIG. 12A is a view showing an RFID tag protected by a protective member, in a tire according to a third embodiment of the present invention.
Figure 12B:
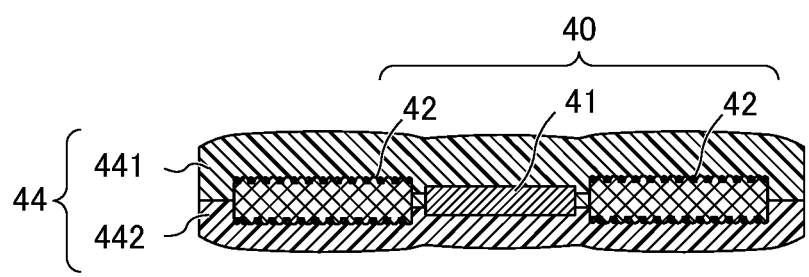
FIG. 12B is a view showing a cross section along the line b-b in FIG. 12A.
Figure 12C:
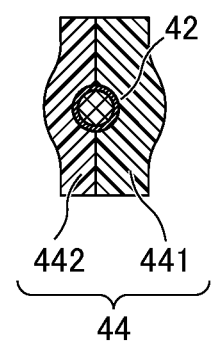
FIG. 12C is a view showing a cross section along the line c-c in FIG. 12A.

Next, a tire according to a third embodiment will be explained while referencing FIGS. 12A to 12C. It should be noted that the same reference symbol will be attached for the same configurations as the first embodiment in the following explanation, and detailed explanations thereof will be omitted. FIG. 12A is a view showing the RFID tag 40 protected by a protective member 44. In FIG. 12A, the RFID tag 40 is covered by a rubber sheet 442 described later and is hidden. FIG. 12B is a cross-sectional view along the line b-b in FIG. 12A, and FIG. 12C is a cross-sectional view along the line c-c in FIG. 12A.

The RFID tag 40 of the present embodiment is covered by a protective member configured from two rubber sheets, similarly to the first embodiment. However, in the present embodiment, the thicknesses of the two rubber sheets constituting the protective member 44 are different. More specifically, the rubber sheet 441 facing the opposite side to the tire inner cavity side, i.e. tire outer surface side, herein the carcass ply 23 on the outer side in the tire-width direction, is formed to be thicker than the rubber sheet 442.

As mentioned earlier, during temperature rise in the vulcanization process of the green tire, since the expansion amount of rubber members such as the inner line 29 surpasses the expansion amount of the carcass ply 23, by the RFID tag 40 being pushed to the carcass ply 23 arranged to the outer side in the tire-width direction thereof, there is a possibility of the rubber sheet on the outer side in the tire-width direction of the RFID tag 40 being damaged. However, according to the present embodiment, due to establishing a form in which the rubber sheet 441 on the side facing the carcass ply 23 on the outer side in the tire-width direction to be thicker, and thus more strongly protecting, it is possible to prevent a situation such that the rubber sheet 441 is damaged during vulcanization.

It should be noted that it is also possible to adopt another configuration for more strongly protecting the outer side in the tire-width direction of the RFID tag 40.

For example, the modulus of the rubber sheet 441 on the outer side in the tire-width direction of the RFID tag 40 may be set to a higher modulus than the modulus of the rubber sheet 442.

In addition, the rubber sheet 441 may be constituted by short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the rubber sheet 441, a rubber sheet in the vulcanized state may be used. The rubber sheet in a vulcanized state does not plastically deform as would raw rubber, and thus can appropriately protect the RFID tag 40. In addition, an organic fiber layer such as of polyester fiber or polyamide fiber may be provided to the rubber sheet 441. In these cases, it is also possible to establish the thicknesses of the rubber sheets 441 and 442 as the same thickness.

Also according to these configurations, since the outer side in the tire-width direction of the RFID tag 40 is more strongly protected, it is possible to prevent a situation such that the rubber sheet 441 is damaged during vulcanization.

According to the tire of the present embodiment, the following effects are exerted in addition to the above (1) to (7).

(8) In the present embodiment, the rubber sheet 441 facing the carcass ply 23 on the outer side in the tire-width direction is formed to be thicker than the rubber sheet 442. Since the outer side in the tire-width direction of the RFID tag 40 is more strongly protected, it is thereby possible to prevent a situation such that the rubber sheet 441 is damaged during vulcanization.

It should be noted that the position at which arranging the RFID tag 40 is not limited to the positions in FIGS. 1, 2, 10 and 11. For example, it may be arranged in the vicinity of the bead filler, or between the carcass ply 23 and side-wall rubber 30. It should be noted that, although the tire of the present invention can be adopted as various types of tires such as for cars, light trucks, trucks and buses, it is particularly suitable as a tire for passenger cars. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire manufacturing method comprising:
preparing an electronic component which includes a coil-shaped spring antenna that transmits or receives wireless signals,
filling rubber only inside the coil-shaped spring antenna of the electronic component, wherein air is not left in the spring antenna between the antenna and the rubber filled inside the antenna;
interposing, between two rubber sheets, the electronic component having the coil-shaped spring antenna into which the rubber was filled; and
setting the electronic component interposed between the two rubber sheets in a tire.

2. The tire manufacturing method according to claim 1, wherein the filling step includes filling the rubber inside the coil-shaped spring antenna until the inside of the coil-shaped spring antenna is completely embedded in the rubber so that air is not left in the spring antenna between the antenna and the rubber.

3. The tire manufacturing method according to claim 2, wherein the tire further includes a carcass ply and a side-wall rubber which is provided to an outer side in a tire-width direction of the carcass ply, and
wherein the rubber sheets are configured from rubber having a higher modulus than the side-wall rubber.

4. A manufacturing method of an electronic component which is interposed between two rubber sheets and includes a coil-shaped spring antenna that transmits and receives wireless signals, and an RFID chip to which the coil-shaped spring antenna is connected, and to be set in a tire,
the method comprises filling, in the electronic component which includes the coil-shaped spring antenna and the RFID chip, rubber only inside the coil-shaped spring antenna of the electronic component;
and
interposing the electronic component which includes the coil-shaped spring antenna in which the rubber was filled and the RFID chip between the two rubber sheets;
wherein
air is not left in the coil-shaped spring antenna between the antenna and the rubber filled inside the antenna.

5. A tire manufacturing method comprising:
preparing an electronic component which includes a coil-shaped spring antenna that transmits or receives wireless signals,
filling rubber only inside the coil-shaped spring antenna of the electronic component;
interposing, between two rubber sheets, the electronic component having the coil-shaped spring antenna into which the rubber was filled, wherein
air is not left in the spring antenna among the antenna, the rubber filled inside the antenna, and the rubber sheets; and
setting the electronic component interposed between the two rubber sheets in a tire.

6. The tire manufacturing method according to claim 5, wherein the filling step includes filling the rubber inside the coil-shaped spring antenna until the inside of the coil-shaped spring antenna is completely embedded in the rubber so that air is not left in the spring antenna between the antenna and the rubber.

7. The tire manufacturing method according to claim 6, wherein the tire further includes a carcass ply and a side-wall rubber which is provided to an outer side in a tire-width direction of the carcass ply, and
wherein the rubber sheets are configured from rubber having a higher modulus than the side-wall rubber.

* * * * *